United States Patent
Itay et al.

(10) Patent No.: US 9,053,375 B2
(45) Date of Patent: Jun. 9, 2015

(54) DECOUPLED CONTACTLESS BI-DIRECTIONAL SYSTEMS AND METHODS

(71) Applicant: On Track Innovations Ltd., Rosh Pina (IL)

(72) Inventors: Hemy Itay, Moshav Bet Hillel (IL); Oded Bashan, Rosh Pina (IL); Yaacov Haroosh, Migdal HaEmek (IL)

(73) Assignee: On Track Innovations Ltd., Rosh Pina (IL)

( * ) Notice: Subject to any disclaimer, the term of this patent is extended or adjusted under 35 U.S.C. 154(b) by 0 days.

(21) Appl. No.: 14/372,685

(22) PCT Filed: Jan. 15, 2013

(86) PCT No.: PCT/IL2013/050038
§ 371 (c)(1),
(2) Date: Jul. 16, 2014

(87) PCT Pub. No.: WO2013/108248
PCT Pub. Date: Jul. 25, 2013

(65) Prior Publication Data
US 2014/0361873 A1  Dec. 11, 2014

Related U.S. Application Data

(63) Continuation of application No. 13/351,883, filed on Jan. 17, 2012, now Pat. No. 8,763,914.

(51) Int. Cl.
*G06K 19/06* (2006.01)
*G06K 19/00* (2006.01)
*G06K 7/08* (2006.01)
*G06K 5/00* (2006.01)
(Continued)

(52) U.S. Cl.
CPC ............ *G06K 7/08* (2013.01); *G06K 19/07773* (2013.01); *G06F 21/35* (2013.01)

(58) Field of Classification Search
USPC .................. 235/492, 487, 493, 380, 451; 340/572.1, 5.86, 5.8; 343/728, 866; 361/818
See application file for complete search history.

(56) References Cited

U.S. PATENT DOCUMENTS 4,135,183 A  1/1979  Heltemes
5,072,222 A  12/1991  Fockens
(Continued)

FOREIGN PATENT DOCUMENTS

JP  3832363  9/2003

OTHER PUBLICATIONS

Bernhard et al., RFID in Metallic Environment, http://www.rfid-systech.eu/20070613_3A_1010_Bernhard_RFID inMetallicEnvironment.PDF, Jun. 13, 2007.
(Continued)

*Primary Examiner* — Daniel Walsh
(74) *Attorney, Agent, or Firm* — Pearl Cohen Zedek Latzer Baratz LLP (57) ABSTRACT

A contactless bi-directional device including first and second generally mutually electromagnetically decoupled contactless loop antennas which are arranged in at least partially mutually overlapping orientation, first and second contactless communication chips, each of the first and second communications chips being connected to a corresponding one of the generally mutually electromagnetically decoupled contactless loop antennas, thereby providing bi-directional communication.

20 Claims, 8 Drawing Sheets

(51) Int. Cl.
*G08B 13/14* (2006.01)
*G05B 19/00* (2006.01)
*G05B 23/00* (2006.01)
*H01Q 21/00* (2006.01)
*H01Q 7/00* (2006.01)
*H05K 9/00* (2006.01)
*G06K 19/077* (2006.01)
*G06F 21/35* (2013.01)

(56) References Cited

U.S. PATENT DOCUMENTS

| | | | |
|---|---|---|---|
| 5,884,271 A | 3/1999 | Pitroda | |
| 7,243,840 B2 | 7/2007 | Bason et al. | |
| 7,268,687 B2 | 9/2007 | Egbert et al. | |
| 7,546,671 B2 | 6/2009 | Finn | |
| 7,591,415 B2 | 9/2009 | Jesme | |
| 7,806,333 B1 | 10/2010 | McReynolds et al. | |
| 7,834,816 B2 | 11/2010 | Marino et al. | |
| 7,847,698 B2 | 12/2010 | Rancien et al. | |
| 7,940,185 B2 | 5/2011 | Rancien et al. | |
| 8,030,745 B2* | 10/2011 | Yamazaki | 257/679 |
| 8,344,958 B2 | 1/2013 | Artigue et al. | |
| 8,763,914 B2 | 7/2014 | Itay et al. | |
| 8,847,831 B2* | 9/2014 | Kato et al. | 343/742 |
| 2001/0011012 A1 | 8/2001 | Hino et al. | |
| 2005/0062672 A1* | 3/2005 | Wakabayashi | 343/867 |
| 2005/0128085 A1 | 6/2005 | Bon | |
| 2006/0065714 A1* | 3/2006 | Jesme | 235/380 |
| 2006/0202835 A1 | 9/2006 | Thibault | |
| 2007/0096924 A1 | 5/2007 | Horne | |
| 2007/0164867 A1 | 7/2007 | Kawai | |
| 2008/0002379 A1 | 1/2008 | Launay | |
| 2008/0072423 A1* | 3/2008 | Finn | 29/854 |
| 2008/0128514 A1* | 6/2008 | Sabbah et al. | 235/492 |
| 2009/0058744 A1* | 3/2009 | Marino | 343/742 |
| 2009/0121964 A1 | 5/2009 | Yamada et al. | |
| 2009/0152363 A1 | 6/2009 | Kim | |
| 2009/0201157 A1 | 8/2009 | Forster | |
| 2009/0224888 A1 | 9/2009 | Caruana | |
| 2009/0229109 A1 | 9/2009 | Finn | |
| 2009/0315680 A1 | 12/2009 | Arimura | |
| 2010/0213261 A1 | 8/2010 | Caruana | |
| 2010/0277382 A1* | 11/2010 | Tanaka et al. | 343/741 |
| 2010/0282855 A1 | 11/2010 | Rancien et al. | |
| 2010/0283690 A1* | 11/2010 | Artigue et al. | 343/702 |
| 2010/0295290 A1 | 11/2010 | Muth et al. | |
| 2010/0295750 A1 | 11/2010 | See et al. | |
| 2011/0002107 A1 | 1/2011 | Tanaka et al. | |
| 2011/0084146 A1* | 4/2011 | Owada | 235/492 |
| 2011/0121080 A1 | 5/2011 | Kai et al. | |
| 2011/0155811 A1 | 6/2011 | Rietzler | |
| 2011/0156864 A1* | 6/2011 | Green | 340/5.2 |
| 2011/0267795 A1* | 11/2011 | Kim et al. | 361/818 |
| 2012/0086556 A1* | 4/2012 | Ikemoto | 340/10.1 |
| 2012/0139703 A1 | 6/2012 | Szoke et al. | |
| 2012/0169472 A1 | 7/2012 | Ikemoto | |
| 2013/0075477 A1 | 3/2013 | Finn et al. | |
| 2013/0181805 A1* | 7/2013 | Saito et al. | 336/84 M |
| 2014/0035793 A1* | 2/2014 | Kato et al. | 343/867 |
| 2014/0104133 A1* | 4/2014 | Finn et al. | 343/866 |
| 2014/0167896 A1* | 6/2014 | Tung et al. | 336/5 |
| 2014/0253404 A1* | 9/2014 | Ikemoto et al. | 343/788 |

OTHER PUBLICATIONS

AAN PT9S Long Range Antenna for cattle ID, http://www.trovan.com/products/FDXB/FDXBfixed/FDXBfixed.html, commercially available from NSG Digital Systems of Kedah, Malaysia, Nov. 4, 2013.
International Search Report of Application No. PCT/IL13/50038 mailed on May 21, 2013.
Office Action of U.S. Appl. No. 13/351,883 mailed Aug. 14, 2013.
Notice of Allowance of U.S. Appl. No. 13/351,883 mailed Feb. 12, 2014.
Corrected Notice of Allowance of U.S. Appl. No. 13/351,883 mailed Jun. 2, 2014.

* cited by examiner

DECOUPLED CONTACTLESS BI-DIRECTIONAL SYSTEMS AND METHODS

CROSS-REFERENCE TO RELATED APPLICATIONS

This application is a National Phase Application of PCT International Application No. PCT/IL2013/050038, International Filing Date Jan. 15, 2013, claiming priority of U.S. patent application Ser. No. 13/351,883, filed Jan. 17, 2012, now U.S. Pat. No. 8,763,914 issued on Jul. 1, 2014, all of which are hereby incorporated by reference in their entirety.

FIELD OF THE INVENTION

The present invention relates to decoupled contactless bi-directional systems and methods.

BACKGROUND OF THE INVENTION

The following patents, patent publications and publications are believed to represent the current state of the art:

U.S. Pat. Nos. 4,135,183; 5,884,271; 7,268,687; 7,591,415; 7,806,333; and 7,834,816;

U.S. Published Patent Application Nos.: 2007/0096924 and 2010/0213261;

Japanese Patent JP3832363;

Bernhard et al., RFID in Metallic Environment, http://www.rfid-systech.eu/20070613_3A_1010_Bernhard_RFIDInMetallicEnvironment.PDF; and AAN PT9S Long Range Antenna for Cattle ID, http://www.trovan.com/products/FDXB/FDXBfixed/FDXB-fixed.html, commercially available from NSG Digital Systems of Kedah, Malaysia.

SUMMARY OF THE INVENTION

The present invention provides decoupled bi-directional systems and methods.

There is thus provided in accordance with a preferred embodiment of the present invention a contactless bi-directional device including first and second generally mutually electromagnetically decoupled contactless loop antennas which are arranged in at least partially mutually overlapping orientation, first and second contactless communication chips, each of the first and second communications chips being connected to a corresponding one of the generally mutually electromagnetically decoupled contactless loop antennas, thereby providing bi-directional communication.

In accordance with a preferred embodiment of the present invention the first contactless loop antenna circumscribes a first area and the second contactless loop antenna lies entirely within a volume defined by a projection of the first area in a direction perpendicular thereto. Preferably, the second contactless loop antenna includes a pair of at least partially non-mutually overlapping generally coplanar loops. Preferably, the pair of at least partially non-mutually overlapping generally coplanar loops are wound in mutually opposite directions.

Preferably, the pair of at least partially non-mutually overlapping generally coplanar loops are interconnected in series and are connected to the second contactless communication chip. Alternatively, the pair of at least partially non-mutually overlapping generally coplanar loops are interconnected in parallel and are connected to the second contactless communication chip.

In accordance with a preferred embodiment of the present invention the pair of at least partially non-mutually overlapping generally coplanar loops are operable for mutually cancelling corresponding electric voltages induced thereon when the pair of coplanar loops are together exposed to a generally uniform electromagnetic field. Additionally, the pair of at least partially non-mutually overlapping generally coplanar loops are operable for adding electric voltage induced thereon when individual ones of the pair of coplanar loops are exposed to generally mutually opposite electromagnetic fields.

Preferably, the first contactless loop antenna circumscribes a first area and at least a mutually identical portion of each of the pair of at least partially non-mutually overlapping generally coplanar loops lies within a volume defined by a projection of the first area in a direction perpendicular thereto.

Preferably, the first contactless loop antenna forms part of a contactless electronic passport. Preferably, the second contactless loop antenna forms part of a contactless electronic visa. Preferably, the first and second contactless loop antennas are each mounted on a separate page of a multi-page passport. Alternatively, the first and second contactless loop antennas are both mounted on a single page of a multi-page passport. Preferably, the first and second contactless communication chips respectively store passport data and visa data.

There is also provided in accordance with another preferred embodiment of the present invention a contactless bi-directional system including first and second generally mutually electromagnetically decoupled contactless loop antennas which are arranged in at least partially mutually overlapping orientation, first and second contactless communication chips, each of the first and second communications chips being connected to a corresponding one of the generally mutually electromagnetically decoupled contactless loop antennas, thereby providing bi-directional communication, and at least one communicator operative to communicate with at least one of the first and second contactless communication chips.

Preferably, at least one of the first and second contactless communication chips are powered by the at least one communicator. Preferably, the at least one communicator includes first and second communicators, the first communicator communicating exclusively with the first chip via the first contactless loop antenna. Additionally, the second communicator communicates exclusively with the second chip via the second contactless loop antenna.

In accordance with a preferred embodiment of the present invention the at least one communicator includes first and second communicators, the first communicator communicating with and powering the first chip exclusively via the first contactless loop antenna. Additionally, the second communicator communicates with and powers the second chip exclusively via the second contactless loop antenna.

Preferably, the first contactless loop antenna circumscribes a first area and the second contactless loop antenna lies entirely within a volume defined by a projection of the first area in a direction perpendicular thereto.

Preferably, the second contactless loop antenna includes a pair of at least partially non-mutually overlapping generally coplanar loops. Additionally, the pair of at least partially non-mutually overlapping generally coplanar loops are wound in mutually opposite directions.

In accordance with a preferred embodiment of the present invention the pair of at least partially non-mutually overlapping generally coplanar loops are interconnected in series and are connected to the second contactless communication chip. Alternatively, the pair of at least partially non-mutually overlapping generally coplanar loops are interconnected in parallel and are connected to the second contactless communication chip.

In accordance with a preferred embodiment of the present invention the pair of at least partially non-mutually overlapping generally coplanar loops are operable for mutually cancelling corresponding electric voltages induced thereon when the pair of coplanar loops are together exposed to a generally uniform electromagnetic field. Alternatively, the pair of at least partially non-mutually overlapping generally coplanar loops are operable for adding electric voltages induced thereon when individual ones of the pair of coplanar loops are exposed to generally mutually opposite electromagnetic fields.

Preferably, the first contactless loop antenna circumscribes a first area and at least a mutually identical portion of each of the pair of at least partially non-mutually overlapping generally coplanar loops lies within a volume defined by a projection of the first area in a direction perpendicular thereto.

Preferably, the first contactless loop antenna forms part of a contactless electronic passport and the first communicator is a passport reader. Preferably, the second contactless loop antenna forms part of a contactless electronic visa and the second communicator is a visa reader.

Preferably, the first and second contactless loop antennas are each mounted on a separate page of a multi-page passport. Alternatively, the first and second contactless loop antennas are both mounted on a single page of a multi-page passport.

Preferably, the first and second contactless communication chips respectively store passport data and visa data.

In accordance with a preferred embodiment of the present invention the first and second communicators include respective first and second generally mutually electromagnetically decoupled communicator contactless loop antennas. Preferably, the first communicator contactless loop antenna circumscribes a first area and the second communicator contactless loop antenna lies entirely within a volume defined by a projection of the first area in a direction perpendicular thereto.

Preferably, the second communicator contactless loop antenna includes a pair of at least partially non-mutually overlapping generally coplanar communicator loops. Preferably, the pair of at least partially non-mutually overlapping generally coplanar communicator loops are wound in mutually opposite directions. Preferably, the first communicator contactless loop antenna circumscribes a first area and at least a mutually identical portion of each of the pair of at least partially non-mutually overlapping generally coplanar communicator loops lies within a volume defined by a projection of the first area in a direction perpendicular thereto.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
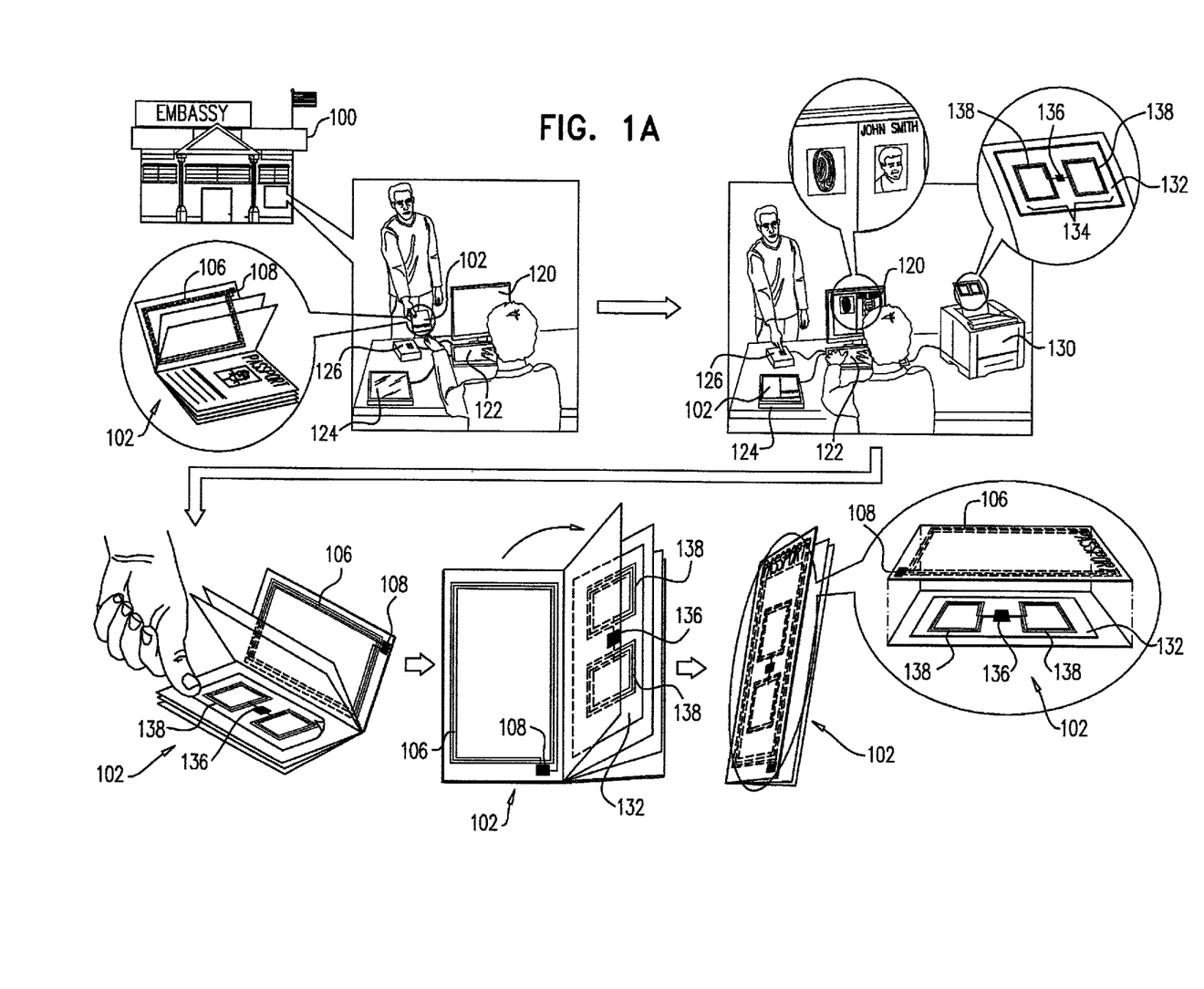
FIGS. 1A and 1B are simplified pictorial illustrations of one stage in the operation of a contactless bi-directional system, constructed and operative in accordance with a preferred embodiment of the present invention.
Figure 1B:
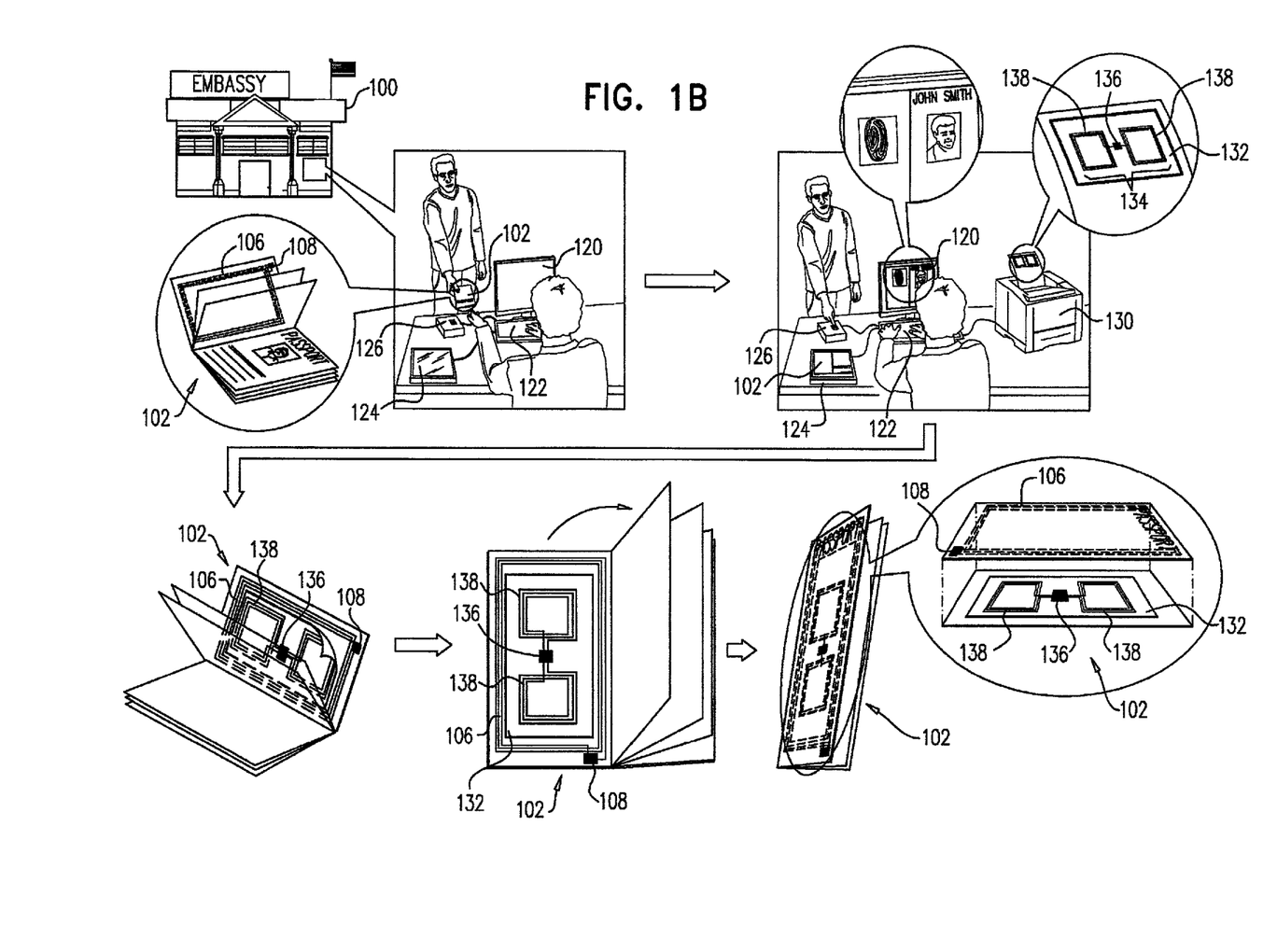
Figure 2A:
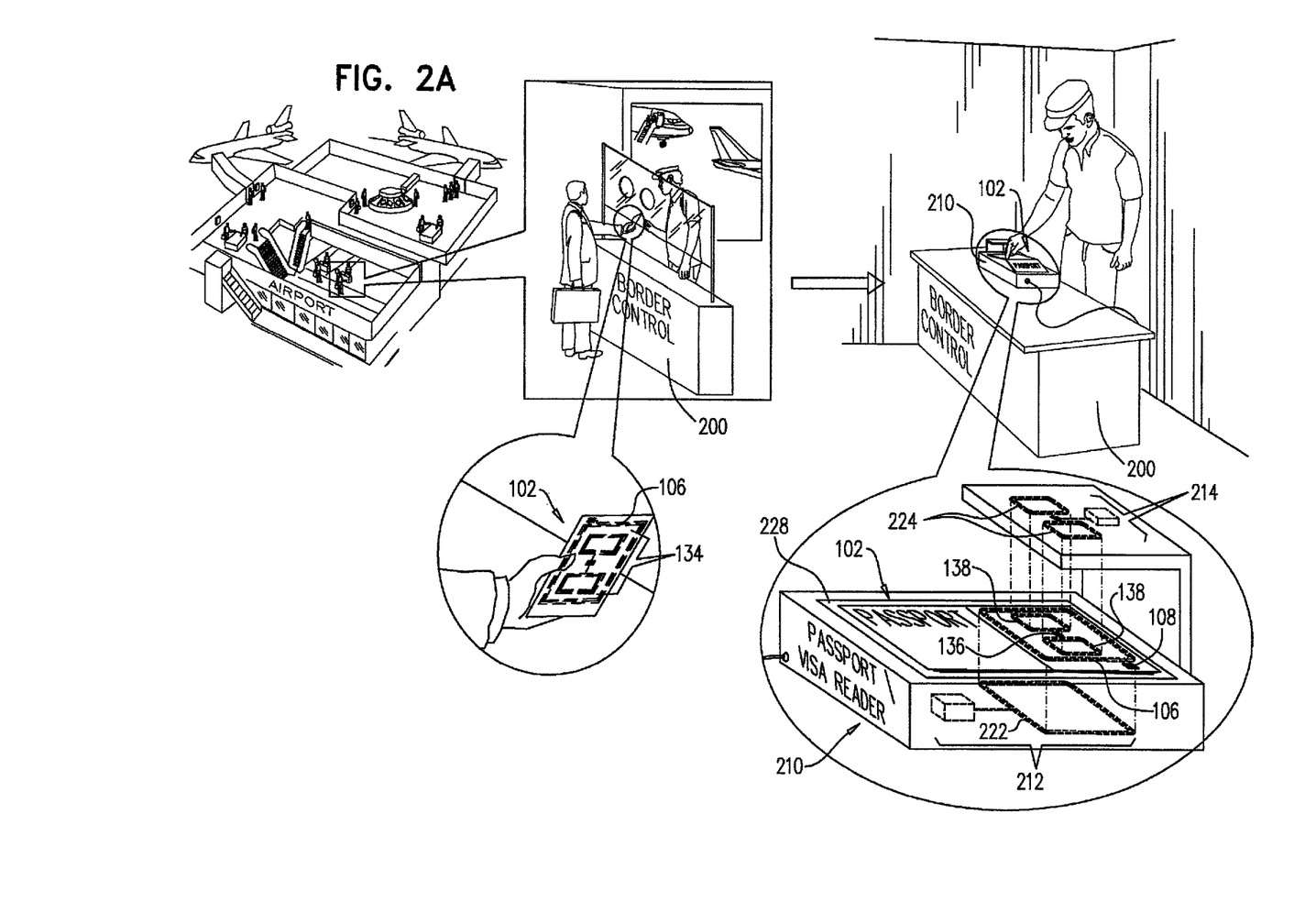
FIGS. 2A, 2B and 2C are simplified pictorial illustrations of various embodiments of another stage in the operation of the system of FIGS. 1A and 1B.
Figure 2B:
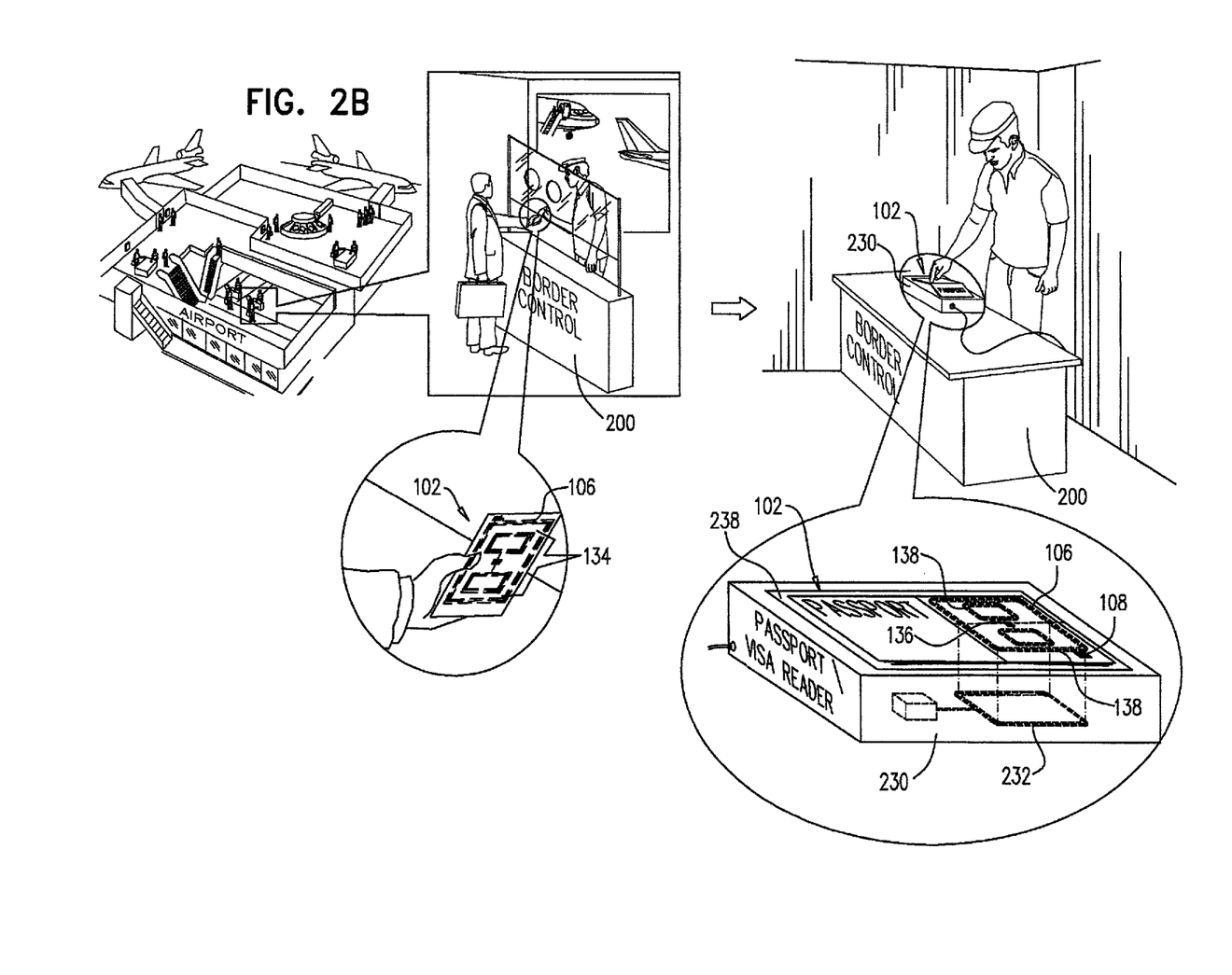
Figure 2C:
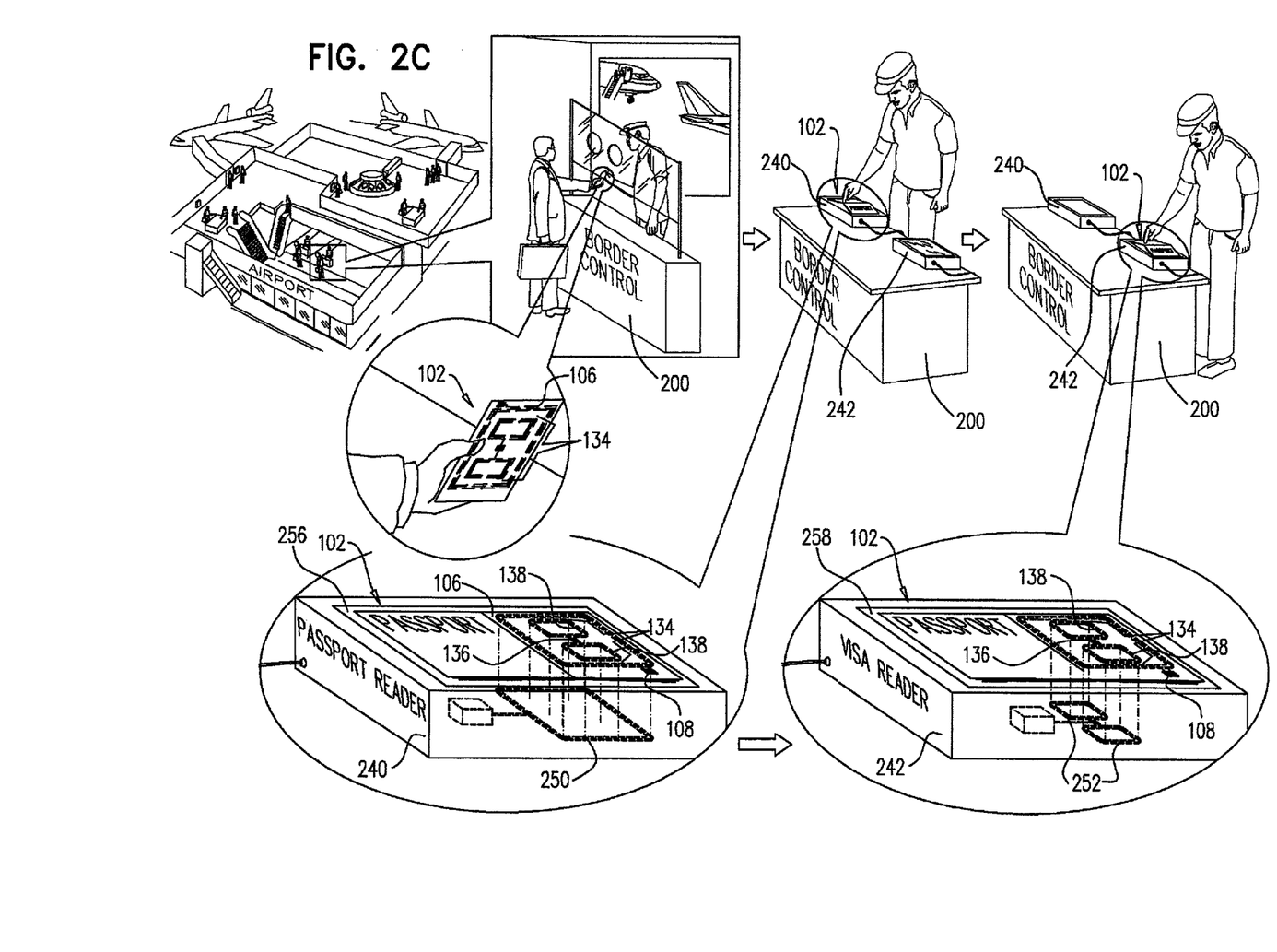

Reference is now made to FIGS. 1A and 1B, which are simplified pictorial illustrations of one stage in the operation of a contactless bi-directional system, constructed and operative in accordance with a preferred embodiment of the present invention, and to FIGS. 2A, 2B and 2C, which are simplified pictorial illustrations of various embodiments of another stage in the operation of the system of FIGS. 1A and 1B. The contactless bi-directional system of FIGS. 1A-2C preferably comprises first and second generally mutually electromagnetically decoupled contactless loop antennas which are arranged in at least partially mutually overlapping orientation, first and second contactless communication chips, each of the first and second communications chips being connected to a corresponding one of the generally mutually electromagnetically decoupled contactless loop antennas, thereby providing bi-directional communication, and at least one communicator operative to communicate with at least one of the first and second contactless communication chips.

It is a particular feature of the present invention that the contactless loop antennas are electromagnetically decoupled, whereby changes to the operating parameters of the first contactless loop antenna by the presence of the second contactless loop antenna are minimized, and whereby electromagnetic coupling between the second contactless loop antenna and a communicator communicating with the first contactless chip is minimized. The decoupling is operative to enable a first communicator to communicate with a first contactless communication chip while preventing the first communicator from communicating with a second contactless communication chip.

It is another particular feature of the present invention that the second communicator is arranged to be electromagnetically decoupled from the first contactless loop antenna while being strongly coupled to the second contactless loop antenna, thereby enabling a second communicator to communicate with the second contactless communication chip while preventing the second communicator from communicating with the first contactless communication chip.

As shown in FIGS. 1A & 1B, on a particular date such as Jan. 15, 2011, an individual such as Mr. John Smith enters an embassy 100 of a foreign country and requests to be issued a travel visa. Mr. Smith provides his passport 102 to a staff member of the embassy, as well as additional personal identification information such as, for example, a name, a picture, and a fingerprint. As clearly seen in FIGS. 1A & 1B, passport 102 includes a passport contactless loop antenna 106 generally centrally fastened to an inner cover of passport 102 and a passport chip module 108 connected thereto. It is appreciated that passport chip module 108 is operable to be activated by voltage induced in passport contactless loop antenna 106.

As further shown in FIGS. 1A & 1B, the staff member preferably enters Mr. Smith's personal identification information into a visa issuing computer 120 preferably via at least one of a keyboard 122, a passport reader 124 and a fingerprint reader 126. It is appreciated that passport reader 124 may be an optical reader operative to optically scan information printed in passport 102 or a contactless communicator operative to communicate with passport chip module 108 of passport 102.

Upon deciding to issue a visa to Mr. Smith, the staff member employs a visa printer 130 to print an adhesive visa sticker 132 for fastening into passport 102. As clearly seen in FIGS. 1A & 1B, visa sticker 132 includes a visa contactless loop antenna 134 generally centered on visa sticker 132 and a visa chip module 136. Visa contactless loop antenna 134 preferably includes two non-mutually overlapping generally coplanar loops 138 which are wound in mutually opposite directions, and which are connected to visa chip module 136. As yet further shown in FIGS. 1A & 1B, visa sticker 132 is fastened to passport 102. It is appreciated that visa sticker 132 may be fastened to the inner cover of passport 102 within an area circumscribed by contactless loop antenna 106 as shown in FIG. 1A, or to an alternative page of passport 102 as shown in FIG. 1B.

It is a particular feature of the present invention that passport contactless loop antenna 106 and visa contactless loop antenna 134 are each fastened to a page of passport 102, and that visa contactless loop antenna 134 lies entirely within a volume defined by a projection of an area circumscribed by passport contactless loop antenna 106 in a direction perpendicular thereto. It is appreciated that alternatively, a mutually identical portion of each of loops 138 lies within a volume defined by a projection of an area circumscribed by passport contactless loop antenna 106 in a direction perpendicular thereto.

It is also appreciated that visa chip module is operable to be activated by voltage induced in visa contactless loop antenna 134, which voltage is a combination of voltages induced in each of loops 138. It is a particular feature of the present invention that when visa contactless loop antenna 134 is placed within a homogenous electric field, such as within a field operative to induce voltage in contactless loop antenna 106, generally equal electric voltages of mutually opposite polarity are induced in mutually oppositely wound loops 138, thereby causing the total voltage induced in visa contactless loop antenna 134 to be generally null.

Turning now to FIG. 2A, it is shown that on a later date, such as on Jan. 30, 2011, Mr. Smith arrives at a border control checkpoint 200 at an airport of the foreign country. Mr. Smith provides his passport 102 which includes passport contactless loop antenna 106, passport chip module 108, visa contactless loop antenna 134 and visa chip module 136 to the staff member of the checkpoint. The staff member then proceeds to place passport 102 onto a passport\visa communicator 210 and employs communicator 210 to retrieve passport information from passport chip module 108 and visa information from visa chip module 136. As shown in FIG. 2A, passport\visa reader 210 includes a passport communicator element 212 operative to communicate with passport chip module 108 and a visa communicator element 214 operative to communicate with visa chip module 136.

Passport communicator element 212 preferably includes a passport communicator electromagnetic field generating coil 222 generally corresponding to the dimensions of passport contactless loop antenna 106. Visa communicator element 214 preferably includes mutually oppositely wound visa reader electromagnetic field generating coils 224 generally corresponding to the dimensions of loops 138.

Passport\visa communicator 210 also includes a reading surface 228 having dimensions which are generally similar to the dimensions of a standard passport. When passport 102 is placed upon reading surface 228, passport contactless loop antenna 106 is aligned generally opposite passport reader electromagnetic field generating coil 222, and loops 138 of visa contactless loop antenna 134 are aligned generally opposite visa reader electromagnetic field generating coils 224.

It is appreciated that when employing passport communicator element 212 to communicate with passport chip module 108, passport communicator element 212 employs electromagnetic field generating coil 222 to produce a passport communicating electromagnetic field which induces an electric voltage within passport contactless loop antenna 106, thereby activating passport chip module 108 which is connected thereto by inducing electric voltage therein. Activation of passport chip module 108 is then operative to enable chip module 108 to communicate passport information stored therewithin to passport communicator element 212.

It is a particular feature of this embodiment of the present invention that the passport communicating electromagnetic field produced by passport reader element 212 also induces generally equal voltages of mutually opposite polarity in each of mutually oppositely wound loops 138 of visa contactless loop antenna 134, thereby generating a generally null net voltage into visa chip module 136 connected to loops 138, thereby causing visa chip module 136 to remain in an inactivated state, and thereby preventing passport communicator element 212 from communicating with visa chip module 136.

It is also appreciated that when employing visa communicator element 214 to communicate with visa chip module 136, visa reader element 214 employs mutually oppositely wound visa reader electromagnetic field generating coils 224 to produce two mutually opposite visa communicating electromagnetic fields which induce generally equal electric voltages of identical polarity within each of mutually oppositely wound loops 138, thereby activating visa chip module 136 which is connected thereto by inducing electric voltage therein. Activation of visa chip module 136 is then operative to enable visa chip module 136 to communicate visa information stored therewithin to visa reader element 214.

It is another particular feature of this embodiment of the present invention that the two mutually opposite visa communicating electromagnetic fields produced by visa reader element 214 induce a generally null net voltage into contactless loop antenna 106 and in chip module 108 connected thereto, thereby causing passport chip module 108 to remain in an inactivated state.

It is therefore yet another particular feature of this embodiment of the present invention that passport contactless loop antenna 106 and visa contactless loop antenna 134 are operatively decoupled, whereby the passport communicating electromagnetic field produced by passport reader element 212 is operative to enable retrieving only information stored on passport chip module 108, and visa reader element 214 is operative to enable retrieving only information stored on visa chip module 136.

In the embodiment illustrated in FIG. 2B, it is shown that the staff member places passport 102 onto a combined passport\visa communicator 230 and employs communicator 230 to retrieve passport information from passport chip module 108 and visa information from visa chip module 136. Communicator 230 is operative to communicate with both passport chip module 108 and visa chip module 136.

Combined passport\visa communicator 230 preferably includes an electromagnetic field generating coil 232 generally corresponding to one half of the dimensions of contactless loop antenna 106, as clearly shown in FIG. 2B.

Combined passport\visa communicator 230 also includes a reading surface 238 having dimensions which are generally similar to the size of a standard passport. When passport 102 is placed upon reading surface 238, part of passport contactless loop antenna 106 is aligned generally opposite part of electromagnetic field generating coil 232, and one of loops 138 of visa contactless loop antenna 134 is aligned generally opposite the interior of the loop formed by visa reader electromagnetic field generating coil 232.

It is appreciated that when employing combined passport\visa communicator 230 to communicate with passport chip module 108 and with visa chip module 136, combined passport\visa communicator 230 employs electromagnetic field generating coil 232 to produce an electromagnetic field which induces an electric voltage within both passport contactless loop antenna 106 and generally in one of loops 138, thereby activating passport chip module 108 and visa chip module 136 respectively connected thereto by inducing electric voltage therein. Activation of chip modules 108 and 136 are then operative to enable chip modules 108 and 136 to communicate passport information and visa information respectively stored therewithin to combined passport\visa communicator 230.

It is a particular feature of this embodiment of the present invention that simultaneous activation of chip modules 108 and 136 is operative to enable retrieving passport information from passport chip module 106 and from visa chip module 136 by a single combined passport\visa communicator 230.

In the embodiment illustrated in FIG. 2C, it is shown that the staff member first places passport 102 onto a passport communicator 240 to retrieve information stored on passport chip module 108, and then proceeds to place passport 102 onto a separate visa communicator 242 to retrieve information stored on visa chip module 136.

Passport communicator 240 preferably includes a passport communicator electromagnetic field generating coil 250 generally corresponding to the dimensions of passport contactless loop antenna 106. Visa communicator 242 preferably includes mutually oppositely wound visa reader electromagnetic field generating coils 252 generally corresponding to the dimensions of loops 138.

Passport communicator 240 also includes a passport reading surface 256 having dimensions which are generally similar to the size of a standard passport. When passport 102 is placed upon reading surface 256, passport contactless loop antenna 106 is aligned generally opposite passport communicator electromagnetic field generating coil 250.

Visa communicator 242 also includes a visa reading surface 258 having dimensions which are generally similar to the size of a standard passport. When passport 102 is placed upon reading surface 256, loops 138 are aligned generally opposite visa communicator electromagnetic field generating coils 252.

It is appreciated that when employing passport communicator 240 to communicate with passport chip module 108, passport communicator 240 employs reader electromagnetic field generating coil 250 to produce a passport communicating electromagnetic field which induces an electric voltage within passport contactless loop antenna 106, thereby activating chip module 108 which is connected thereto by inducing electric voltage therein. Activation of passport chip module 108 is then operative to enable chip module 108 to communicate passport information stored therewithin to passport communicator 240.

It is a particular feature of this embodiment of the present invention that the passport communicating electromagnetic field produced by passport reader 240 also induces generally equal voltages of mutually opposite polarity in each of mutually oppositely wound loops 138 of visa contactless loop antenna 134, thereby generating a generally null net current in visa chip module 136 connected to loops 138 and thereby causing visa chip module 136 to remain in an inactivated state.

It is also appreciated that when employing visa communicator 242 to communicate with visa chip module 136, visa reader 242 employs mutually oppositely wound visa reader electromagnetic field generating coils 252 to produce two mutually opposite visa communicating electromagnetic fields which induce generally equal electric voltages of identical polarity within each of mutually oppositely wound loops 138, thereby activating visa chip module 136 which is connected thereto by inducing electric voltage therein. Activation of chip module 136 is then operative to enable chip module 136 to communicate visa information stored therewithin to visa reader 242.

It is another particular feature of this embodiment of the present invention that the two mutually opposite visa reading electromagnetic field produced by visa reader 242 induce a generally null net voltage in contactless loop antenna 106 and in chip module 108 connected thereto, thereby causing passport chip module 108 to remain in an inactivated state.

It is therefore yet another particular feature of this embodiment of the present invention that passport contactless loop antenna 106 and visa contactless loop antenna 134 are operatively decoupled, whereby the passport communicating electromagnetic field produced by passport reader 240 is operative to enable retrieving only information stored on passport chip module 108, and visa reader 242 is operative to enable retrieving only information stored on visa chip module 136.

Reference is now made to FIGS. 3A, 3B, 3C, 3D and 3E, which are simplified pictorial illustrations of electric voltages induced in contactless loop antennas which are part of the system of FIGS. 1A-2C.

Figure 3A:
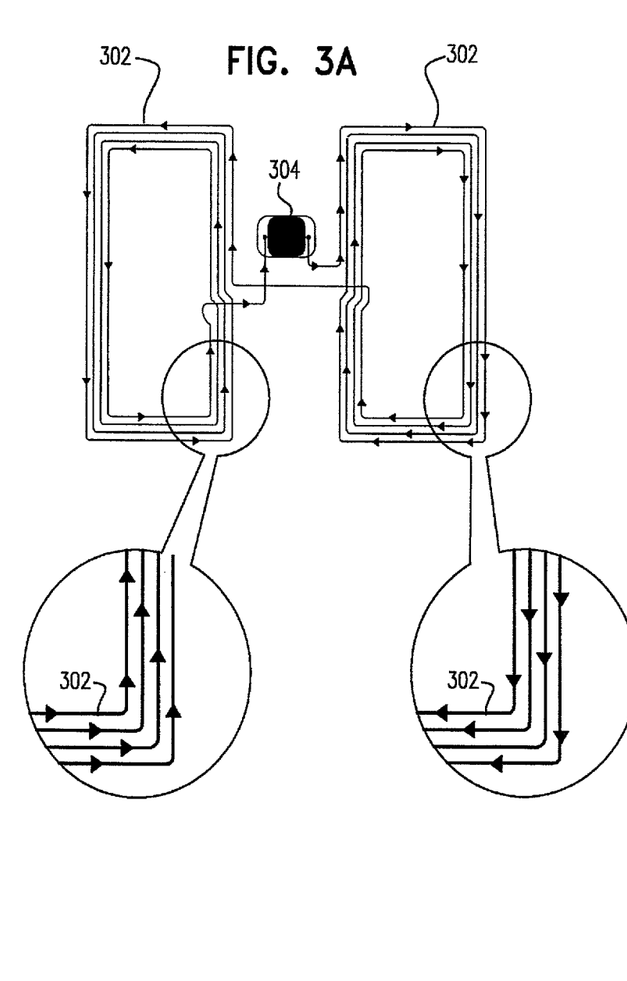
FIGS. 3A, 3B, 3C, 3D and 3E are simplified pictorial illustrations of electric voltages induced in contactless loop antennas which are part of the system of FIGS. 1A-2C.

In the example of FIG. 3A, two contactless loop antennas 302 are wound in mutually opposite directions, and are serially connected to a chip module 304. When placed within an electromagnetic field generated by two mutually oppositely wound electromagnetic field generating coils such as coils 224 of visa communicator element 214 illustrated in FIG. 2A or coils 252 of visa communicator 242 illustrated in FIG. 2C, generally equal electric voltages of identical polarity are induced within each of oppositely wound contactless loop antennas 302, thereby generating an activating electric voltage in chip module 304.

Figure 3B:
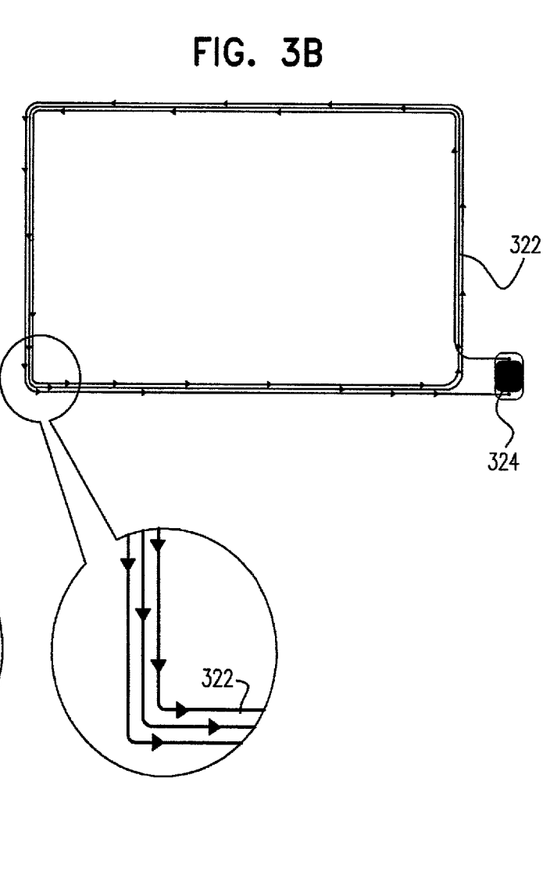

In the example of FIG. 3B, a contactless loop antenna 322 is connected to a chip module 324. When placed within an electromagnetic field generated by an electromagnetic field generating coil such as coil 222 of passport communicator element 212 illustrated in FIG. 2A or coil 250 of passport reader 240 illustrated in FIG. 2C, an electric voltage is induced within contactless loop antenna 322, thereby generating an activating electric voltage in chip module 324.

Figure 3C:
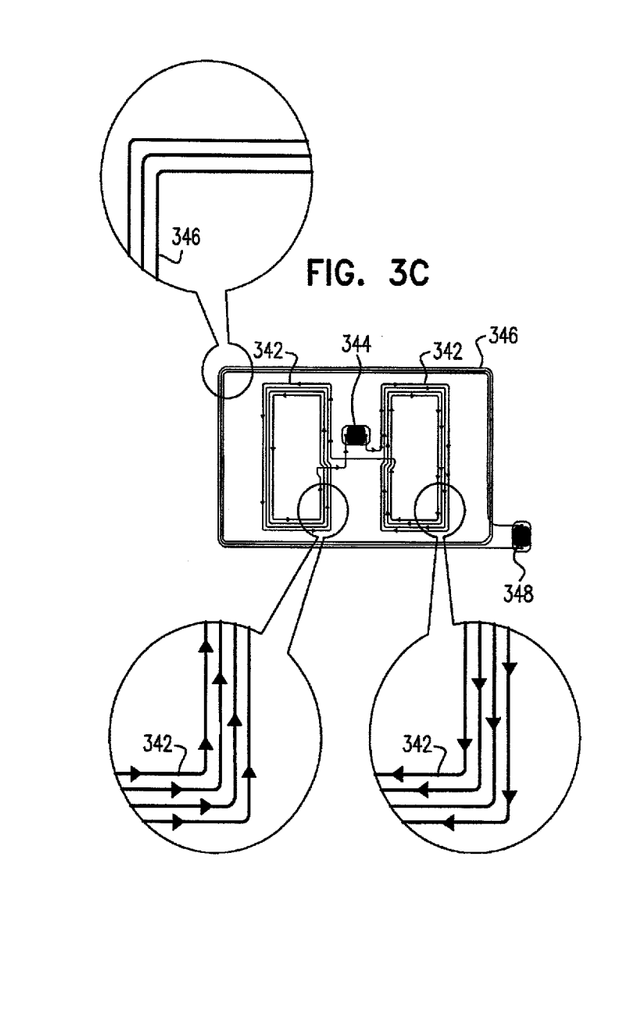
Figure 3D:
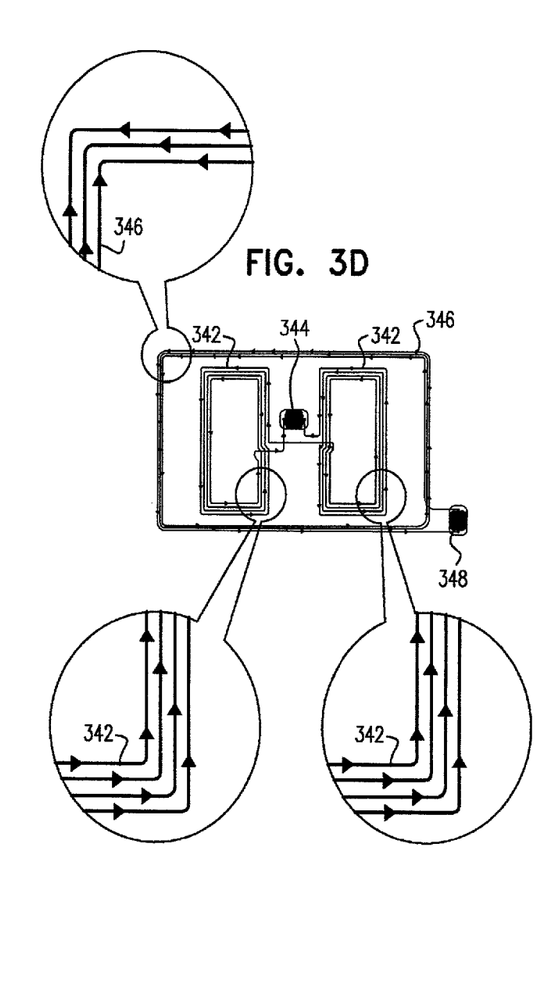

In the examples of FIGS. 3C & 3D, two inner contactless loop antennas 342 which are wound in mutually opposite directions are serially connected to a chip module 344, and an outer contactless loop antenna 346 is connected to a chip module 348.

As shown in FIG. 3C, when placed within an electromagnetic field generated by two oppositely wound electromagnetic field generating coils such as coils 224 of visa communicator element 214 illustrated in FIG. 2A or coils 252 of visa communicator 242 illustrated in FIG. 2C, generally equal electric voltages of identical polarity are induced within each of oppositely wound inner contactless loop antennas 342, thereby generating an activating electric voltage in chip module 344, while generating a generally null voltage in outer contactless loop antenna 346.

As shown in FIG. 3D, when placed within an electromagnetic field generated by an electromagnetic field generating coil such as coil 222 of passport communicator element 212 illustrated in FIG. 2A or coil 250 of passport communicator 240 illustrated in FIG. 2C, an electric voltage is induced within outer contactless loop antenna 346, thereby generating an activating electric voltage in chip module 348 while inducing generally equal electric voltages of mutually opposite polarity in each of mutually oppositely wound inner contactless loop antennas 342, thereby generating a generally null net voltage in chip module 344 and thereby causing chip module 344 to remain in an inactivated state.

Figure 3E:
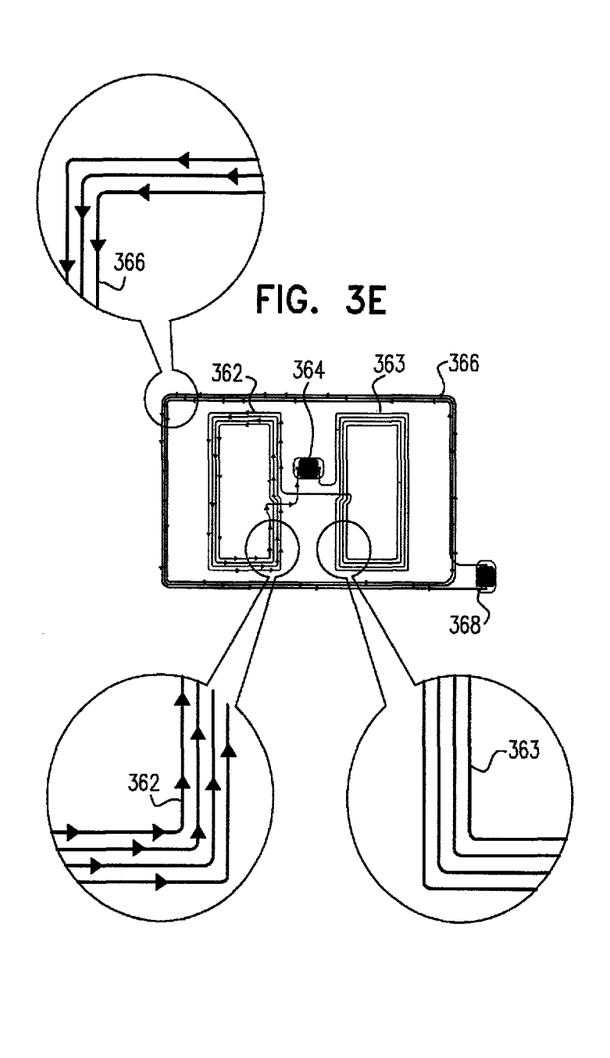

In the example of FIG. 3E, two inner contactless loop antennas 362 and 363 which are wound in mutually opposite directions are serially connected to a chip module 364, and an outer contactless loop antenna 366 is connected to a chip module 368. As shown in FIG. 3E, when smart card device 360 is placed within an electromagnetic field generated by one electromagnetic field generating coil such coil 232 of combined passport\visa communicator 230 illustrated in FIG. 2B, relatively strong electric voltages are induced within both inner contactless loop antenna 362 and outer contactless loop antenna 366 thereby generating activating electric voltages in both of chip modules 364 and 368, while generating a generally insignificant electric voltage in inner contactless loop antenna 363.

It will be appreciated by persons skilled in the art that the present invention is not limited by what has been particularly shown and described hereinabove. Rather the scope of the present invention includes combinations and subcombinations of various features described hereinabove as well as variations and modifications thereof which would occur to persons reading the foregoing and which are not in the prior art.

The invention claimed is:

1. A contactless communication device comprising:
 first and second contactless communication chips;
 first and second generally mutually electromagnetically decoupled contactless loop antennas each connected to a corresponding one of the first and second contactless communication chips, the first contactless loop antenna comprising a loop that circumscribes an area and the second contactless loop antenna comprising a pair of at least partially non-mutually overlapping generally coplanar loops wound in mutually opposite directions,
 placing the first contactless communication chip being operable to communicate information to a contactless reading device, the contactless reading device operable to read the contactless communication device, upon the first and second contact loop antennas being placed in a generally uniform electromagnetic field generated by a first electromagnetic field generating coil of the contactless reading device, wherein the placement results in a null voltage being induced in the second contactless loop antenna and a voltage enabling the first contactless communication chip to communicate information to the contactless reader device being induced in the first contactless loop antenna, and
 the second contactless communication chip being operable to communicate information to the contactless reading device upon the first and second contact loop antennas being placed in generally mutually opposite electromagnetic fields aligned with the coplanar loops and generated by a second electromagnetic field generating coil of the contactless reading device aligned with the coplanar loops, wherein the placement results in a null voltage being induced in the first contactless loop antenna and a voltage enabling the second contactless communication chip to communicate information to the contactless reader device being induced in the second contactless loop antenna, the voltage induced in the second contactless loop antenna corresponding to a sum of induced voltages on each of the pair of coplanar loops.

2. The contactless communication device of claim 1, wherein dimensions of the first and second electromagnetic field generating coils generally correspond to dimensions of respective ones of the first and second contactless loop antennas.

3. The contactless communication device of claim 1, wherein one or more of the first and second contactless communication chips are operable to communicate information when the first and second contactless loop antennas are at least partially aligned generally opposite respective ones of the first and second electromagnetic field generating coils.

4. The contactless communication device of claim 1, wherein the first contactless communication chip is operable to communicate information when the loop of the first contactless loop antenna is aligned with a loop of the first electromagnetic field generating coil.

5. The contactless communication device of claim 1, wherein the second contactless communication chip is operable to communicate information when the pair of loops of the second contactless loop antenna are aligned with one or both of a pair of at least partially non-mutually overlapping generally coplanar loops of the second electromagnetic field generating coil.

6. The contactless communication device of claim 1, wherein the first electromagnetic field generating coil enables retrieving only information stored on the first contactless communication chip and the second electromagnetic field generating coil enables retrieving only information stored on the second contactless communication chip.

7. The contactless communication device of claim 1, wherein when the second contactless loop antenna is placed in the generally uniform electromagnetic field, generally equal electronic voltages of mutually opposite polarity are induced thereby cancelling the electric voltages induced in the mutually oppositely wound loops, and when the second contactless loop antenna is placed in the generally mutually opposite electromagnetic fields, generally equal electronic voltages of identical polarity are induced thereby adding the electric voltages induced in the mutually oppositely wound loops.

8. The contactless communication device of claim 1, wherein at least a mutually identical portion of each of the pair of at least partially non-mutually overlapping generally coplanar loops lies within a volume defined by a projection of the circumscribed area in a direction perpendicular thereto.

9. The contactless communication device of claim 1, wherein the pair of at least partially non-mutually overlapping generally coplanar loops are interconnected in series.

10. The contactless communication device of claim 1, wherein the pair of at least partially non-mutually overlapping generally coplanar loops are interconnected in parallel.

11. A contactless communication system comprising:
 a contactless communication chip device comprising:
   first and second contactless communication chips;
   first and second generally mutually electromagnetically decoupled contactless loop antennas each connected to a corresponding one of the first and second communications chips, the second contactless loop antenna comprising a pair of at least partially non-mutually overlapping generally coplanar loops wound in mutually opposite directions; and
 a contactless reader device comprising:
   first and second electromagnetic field generating coils, wherein the first electromagnetic field generating coil is configured to generate a generally uniform electromagnetic field at the first and second contactless loop antennas that induces a voltage in the first contactless loop antenna enabling the first contactless communication chip to communicate information to the contactless reader device and inducing a voltage in the second contactless loop antenna that is generally null, and wherein the second electromagnetic field generating coil when aligned with the coplanar loops is configured to generate generally mutually opposite electromagnetic fields at the first and second contactless loop antennas aligned with the coplanar loops that induces a voltage in the first contactless loop antenna that is generally null and inducing a voltage in the second contactless loop antenna corresponding to a sum of induced voltages on each of the pair of coplanar loops enabling the second contactless communication chip to communicate information to the contactless reader device.

12. The contactless communication system of claim 11, wherein dimensions of the first and second electromagnetic field generating coils generally correspond to dimensions of respective ones of the first and second contactless loop antennas.

13. The contactless communication system of claim 11, wherein one or more of the first and second contactless communication chips are operable to communicate information when the first and second contactless loop antennas are at least partially aligned generally opposite respective ones of the first and second electromagnetic field generating coils.

14. The contactless communication system of claim 11, wherein each of the first contactless loop antenna and the first electromagnetic field generating coil comprises a loop that circumscribes an area.

15. The contactless communication system of claim 11, wherein each of the second contactless loop antenna and the second electromagnetic field generating coil comprises a pair of at least partially non-mutually overlapping generally coplanar loops wound in mutually opposite directions.

16. The contactless communication device of claim 15, wherein when the second contactless loop antenna is placed in the generally uniform electromagnetic field, generally equal electronic voltages of mutually opposite polarity are induced thereby cancelling the electric voltages induced in the mutually oppositely wound loops, and when the second contactless loop antenna is placed in the generally mutually opposite electromagnetic fields, generally equal electronic voltages of identical polarity are induced thereby adding the electric voltages induced in the mutually oppositely wound loops.

17. The contactless communication device of claim 11, wherein said first contactless loop antenna circumscribes an area and at least a mutually identical portion of each of the pair of at least partially non-mutually overlapping generally coplanar loops lies within a volume defined by a projection of the area in a direction perpendicular thereto.

18. A method of communicating using a contactless communication device comprising first and second contactless communication chips and first and second generally mutually electromagnetically decoupled contactless loop antennas each connected to a corresponding one of the first and second contactless communication chips, the first contactless loop antenna comprising a loop that circumscribes an area and the second contactless loop antenna comprising a pair of at least partially non-mutually overlapping generally coplanar loops wound in mutually opposite directions, the method comprising:

communicating information from the first contactless communication chip to a contactless reading device by the contactless reading device reading the contactless communication device upon placing the first and second contactless loop antennas in a generally uniform electromagnetic field generated by a first electromagnetic field generating coil of the contactless reading device, wherein the placement results in a null voltage being induced in the second contactless loop antenna and a voltage enabling the first contactless communication chip to communicate information to the contactless reader device being induced in the first contactless loop antenna, and communicating information from the second contactless communication chip to the contactless reading device upon placing the first and second contactless loop antennas in generally mutually opposite electromagnetic fields aligned with the coplanar loops and generated by a second electromagnetic field generating coil of the contactless reading device aligned with the coplanar loops, wherein the placement results in a null voltage being induced in the first contactless loop antenna and a voltage enabling the second contactless communication chip to communicate information to the contactless reader device being induced in the second contactless loop antenna, the voltage induced in the second contactless loop antenna corresponding to a sum of induced voltages on each of the pair of coplanar loops.

19. The method of claim 18 comprising retrieving only information stored on the first contactless communication chip using the first electromagnetic field generating coil and retrieving only information stored on the second contactless communication chip using the second electromagnetic field generating coil.

20. The method of claim 18, wherein when the second contactless loop antenna is placed in the generally uniform electromagnetic field, generally equal electronic voltages of mutually opposite polarity are induced thereby cancelling the electric voltages induced in the mutually oppositely wound loops, and when the second contactless loop antenna is placed in the generally mutually opposite electromagnetic fields, generally equal electronic voltages of identical polarity are induced.

\* \* \* \* \*